May 27, 1930.   W. MILLER   1,760,709
ROLLER CLUTCH
Original Filed Feb. 3, 1927

Inventor:
William Miller:
By  *Attorney.*

Patented May 27, 1930

1,760,709

UNITED STATES PATENT OFFICE

WILLIAM MILLER, OF DUNSTON-ON-TYNE, ENGLAND

ROLLER CLUTCH

Original application filed February 3, 1927, Serial No. 165,668, and in Great Britain February 17, 1926. Divided and this application filed June 21, 1928. Serial No. 287,233.

This invention relates to roller clutches and is a division of my prior application Serial No. 165,668, filed 3rd February, 1927, now Patent No. 1,735,125, granted November 12, 1929.

The invention relates to roller clutches wherein one of the clutch members (hereinafter referred to as the "roller-carrying member") has associated therewith one or more roller units each comprising an even number of rollers arranged in a line substantially transverse of the direction of movement of the clutch members, the said roller units co-operating with cam or wedge surfaces, so that when one of the clutch members is moved, a virtual toggle action occurs between the rollers and clutch members with a consequent effective engagement.

The object of the invention is to provide a form of clutch wherein separate wedges are employed, with improved means for controlling said wedges for changing the operation of the clutch.

The invention will be described with reference to the accompanying drawing which shows one form of construction according to the invention. In the said drawing.

Figure 1:
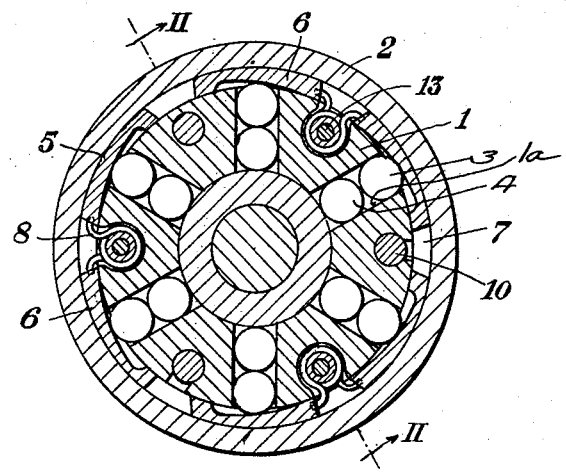
Fig. 1 is a sectional elevation taken on the line I—I of Fig. 2.

Referring more particularly to the drawing, 1 indicates the roller-carrying member of the clutch which takes the form of an annulus, and 2 the other clutch member, which is of channel section; the member 1 being adapted to oscillate in the channel, the side walls of which constitute a pair of spaced concentric flanges. The numerals 3, 4 indicate the two rollers forming roller units inside radial slots 1ª in the annulus 1; the outer faces of the rollers 3 and 4 (that is to say, the faces which project beyond the inner and outer peripheries of the annulus) being embraced by the said flanges. The numerals 5, 6 indicate pairs of oppositely-disposed wedges. Cam members 7 are interposed between the narrow ends of pairs of wedges 5 and 6 which are spring pressed against the cam members 7 by means of springs 8 or 9 located between the thick ends of the wedges 5 and 6. The said cam members 7 are rigidly secured to pins 10 which project from a collar 11 mounted on a sleeve 12 integral with the member 1. The ends of the wedges which contact with a cam 7 are shaped so that during the movement of the said cam in one direction from its mean position, one of the said wedges is unaffected and remains stationary, and the other wedge is moved towards the cam 7 by its respective spring, while during movement in the opposite direction the reverse action occurs.

The springs may either be in the form of coil springs 8, each of which is wound around a pin 13 located between the thick ends of adjacent wedges and has its ends pressing against said ends; or they may be in the form of helical springs 9 each of which is inserted in recesses in the ends of two adjacent wedges.

Figure 2:
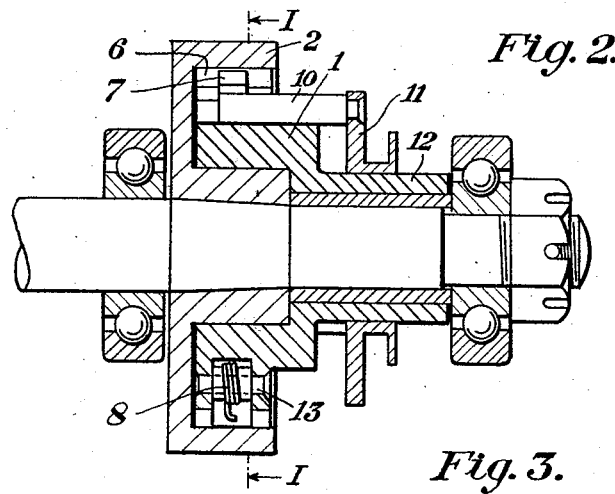
Fig. 2 is a longitudinal section taken on the line II—II of Fig. 1.
Figure 3:
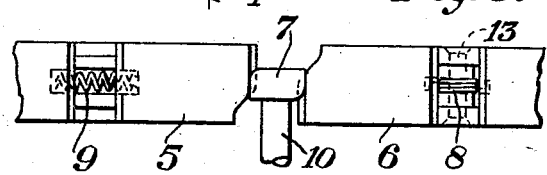
Fig. 3 is a development showing the means for moving the wedges of the arrangement shown in Figs. 1 and 2 to their forward and reverse positions.

The action of the clutch is as follows: Assuming the member 1 to be oscillatory, if it is desired to drive the member 2 in a clockwise direction, the wedges 6 will be the driving wedges. By moving the collar 11 and thus the cams 7 to the right (Fig. 2) or upwards (Fig. 3), the wedges 6 will be moved by their springs into operative position. Movement of the roller-carrying member 1 will cause the wedges 6 to be engaged by their respective rollers and thus pressed against the clutch face of the member 2, so that the latter is turned.

If it is desired to drive the member 1 in a counter-clockwise direction, the pins 10 are moved to the right (Fig. 2) or downwards (Fig. 3) so that the wedge 6 is now held out of operative contact with its rollers and the wedge 5 is allowed to move into its operative position.

I claim:

1. A clutch comprising two members, an even number of circumferentially-contacting rolling elements arranged in one of said members substantially transverse to the direction of movement of the clutch members, a pair of flanges on the other clutch member, said flanges embracing the outer of said rolling elements, wedges adapted to cooperate with one of said flanges and its adjacent rolling elements so that when one of the clutch members is moved the clutch is engaged, and controlling means adapted to cooperate with the ends of the wedges and to be operated so as to move transversely to the direction of movement of the wedges, so that on movement of the said controlling means the position of the wedges relatively to their rolling elements may be changed.

2. A clutch comprising two members one of which is an annulus, an even number of circumferentially-contacting rolling elements arranged in said annulus substantially transverse to the direction of movement of the clutch members, a pair of flanges on the other clutch member, said flanges embracing the outer faces of said rolling elements, wedges adapted to cooperate with one of said flanges and its adjacent rolling elements so that when one of the clutch members is moved the clutch is engaged, and controlling means adapted to cooperate with the ends of the wedges; said controlling means comprising camming means interposed between the narrow ends of oppositely-disposed wedges, abutments on the roller-carrying member, springs interposed between said abutments and the thick ends of the wedges, and means for imparting transverse movement to said camming means.

3. A clutch according to claim 1, wherein the controlling means comprise camming means interposed between wedges, an operating member movable transversely to the direction of movement of the wedges, and means to rigidly connect said camming means with said operating member.

4. A clutch according to claim 2, wherein the ends of the wedges are shaped so as to coact with the camming means in such a way that, during the movement of the camming means in one direction from its mean position, one of the wedges is unaffected and remains stationary, and the other wedge is moved towards the cam by its respective spring, while during movement in the opposite direction the reverse action occurs.

5. A clutch according to claim 2, wherein the means for imparting movement to the camming means comprises a plurality of transversely-disposed pins each of which is rigidly secured at one end to said camming means, and a collar secured to the other ends of the said pins.

6. A clutch according to claim 2, and including a plurality of pairs of oppositely-disposed wedges, an abutment on the annulus between the thick ends of each pair of wedges, and a coil spring around said abutment, the ends of said spring being adapted to press against the thick ends of the wedges.

In witness whereof I have signed this specification.

WILLIAM MILLER.